United States Patent [19]

Takeuchi et al.

[11] Patent Number: 4,961,078

[45] Date of Patent: Oct. 2, 1990

[54] THERMALLY RECORDING HEAD USING INTEGRATED MICA AS THE SPACER LAYER

[75] Inventors: Yukihisa Takeuchi; Toshikazu Hirota, both of Nagoya, Japan

[73] Assignee: NGK Insulators, Ltd., Japan

[21] Appl. No.: 353,762

[22] Filed: May 18, 1989

[30] Foreign Application Priority Data

May 20, 1988 [JP] Japan ............................... 63-124496

[51] Int. Cl.[5] .............................................. G01D 15/10

[52] U.S. Cl. ................................ 346/76 PH; 219/216

[58] Field of Search ............. 346/76 PH; 219/216 PH

[56] References Cited

U.S. PATENT DOCUMENTS

| | | | |
|---|---|---|---|
| 3,968,500 | 7/1976 | Meisel et al. | 346/139 C |
| 4,082,619 | 4/1978 | Dehnert | 346/165 |
| 4,684,960 | 8/1987 | Nishiwaki | 346/76 PH |

FOREIGN PATENT DOCUMENTS

| | | |
|---|---|---|
| 0041042 | 3/1980 | Japan . |
| 58-12790 | 1/1983 | Japan . |
| 58-104787 | 6/1983 | Japan . |
| 61-35972 | 2/1986 | Japan . |
| 61-37493 | 2/1986 | Japan . |
| 61-230966 | 10/1986 | Japan . |
| 0099162 | 5/1987 | Japan . |
| 62-292461 | 12/1987 | Japan . |
| 63-30279 | 2/1988 | Japan . |
| 63-87264 | 4/1988 | Japan . |

*Primary Examiner*—Bruce A. Reynolds
*Assistant Examiner*—Huan Tran
*Attorney, Agent, or Firm*—Arnold, White & Durkee

[57] ABSTRACT

A recording head having a plurality of recording electrodes and at least one return circuit electrode. The recording head further includes an insulating layer consisting of an integrated mica, which is disposed between an array of the plurality of recording electrodes and the return circuit electrode, so as to form a multi-layer structure which includes the recording and return circuit electrodes, and the insulating layer. The recording and return circuit electrodes are formed of an electrically conductive material which has a higher degree of wear resistance than that of the integrated mica.

10 Claims, 1 Drawing Sheet

THERMALLY RECORDING HEAD USING INTEGRATED MICA AS THE SPACER LAYER

BACKGROUND OF THE INVENTION

1. Field of the Invention

The present invention relates generally to a recording or printing head which is adapted to apply an electric current to an ink film or ribbon, or a recording medium, for effecting thermal printing of images such as characters on the recording medium. More particularly, the present invention is concerned with a multi-layer structure including a plurality of electrodes for locally energizing the ink film or recording medium.

2. Discussion of the Prior Art

Numerous proposals have been made in connection with an arrangement of electrodes in a recording or printing head. For example, laid-open Publication Nos. 61-35972, 58-12790, 61-230966, and 62-292461 of unexamined Japanese Patent Applications disclose a recording head having a multi-layer structure which includes a plurality of recording electrodes and a return circuit electrode (referred to as "common electrode") or a plurality of return circuit electrodes. More specifically, the recording and return circuit electrodes are held in contact with an ink film having an ink layer and an electrically resistive layer formed separately from the ink layer. The electrically resistive layer is locally energized to generate heat, by an electric current applied thereto by the electrodes of the recording head, so that a thermally fusible or vaporizable ink material on the corresponding local portions of the ink layer is softened or diffused due to heat of the electrically resistive layer, and then transferred to an ordinary recording medium. Thus, the printing of images is effected by the recording head. Alternatively, the ink film may have an electrically resistive ink layer which serves both as an ink layer and an electrically resistive layer. According to the structure of the recording head disclosed in the publications, an electrically insulating layer is disposed between an array of the recording electrodes and the return circuit electrode or an array of the return circuit electrodes.

In the recording head which incorporates the electrodes in its multi-layer structure as described above, it is required that the recording and return circuit electrodes are positioned with a high degree of accuracy so as to provide a constant spacing between each recording electrode and the return circuit electrode or electrodes. This is desired for preventing crosstalk between the electrodes, and for assuring consistent image transfer with enhanced reproducibility, namely, for obtaining transferred images consisting of a multiplicity of uniformly pointed dots.

Another type of recording head as disclosed in laid-open Publication No. 63-87264 of unexamined Japanese Patent Application is adapted to perform its printing operation on a heat-sensitive paper (recording medium). The heat-sensitive paper having both an electrically resistive layer and a coloring layer, or an electrically resistive coloring layer is directly held in contact with a recording surface of the recording head, while the heat-sensitive paper having only a coloring layer is used such that the recording head effects thermal printing of images on the paper through an electrically resistive film. Alternatively, an electrically resistive ink layer as indicated above is used, as indicated in laid-open Publication Nos. 58-104787, 61-37493 and 63-30279 of unexamined Japanese Patent Applications, in which the disclosed recording heads perform the thermal printing of images on an ordinary recording medium through the electrically resistive ink layer. In these publications indicated above, there is no description of the multi-layer structure of recording head in which the array of recording electrodes are spaced by a suitable distance from the return circuit electrode or electrodes, as described above. If such a multi-layer structure of recording head is used to effect the thermal printing of images on the heat-sensitive paper or through the electrically resistive ink layer, as indicated in the above publications, it is required that the recording and return circuit electrodes are highly accurately positioned so as to provide a constant spacing therebetween, as in the case described above.

To enable the electrodes of the recording head to be constantly held in contact with the electrically resistive layer or electrically resistive ink or coloring layer of the ink film or heat-sensitive recording medium, for local energization thereof, the insulating layer disposed between the recording and return circuit electrodes is required to be made of a material having a lower degree of wear resistance than that of the electrodes. The insulating layer also needs to have a considerably high degree of heat resistance, so as to prevent deterioration of its insulating property and a chronological change in the thickness of the layer, due to heat generated by the electrically resistive layer or electrically resistive ink or coloring layer, which lead to deterioration in the quality of printed or transferred images.

In the conventional recording head formed in a multi-layer structure including the recording and return circuit electrodes, however, the insulating layer disposed between the electrodes does not satisfy the latter requirement for heat resistance, since the insulating layer is for example formed of a resin material such as an epoxy resin or a polyimide.

In some conventional recording heads, the insulating layer disposed between electrodes is made of an ordinary glass or ceramic material. While such an insulating layer is satisfactory in its heat resistance, the wear resistance of the insulating layer is higher than that of the electrodes, resulting in an insufficient electrical contact of the electrodes with the electrically resistive layer of the ink film. Thus, it is difficult to obtain an optimum relative wear resistance between the insulating layer and the electrodes.

Where the electrically insulating layer is formed of mica, the layer has a high degree of heat resistance and sufficient insulating property. However, the use of ordinary mica for the insulating layer may cause insufficient uniformity in the thickness of the insulating layer, which determines a spacing between the recording and return circuit electrodes. Consequently, the recording head having such an insulating layer suffers from deterioration in the quality of the transferred images.

SUMMARY OF THE INVENTION

The present invention was developed in view of the above problems experienced in the prior art. It is therefore an object of the invention to provide a recording head having a multi-layer structure including a plurality of recording electrodes and at least one return circuit electrode, which assures improved heat resistance, sufficient electrical insulation between the recording and return circuit electrodes, and a stable permanent electrical contact between the electrodes and an electrically resistive layer or electrically resistive ink or coloring layer of an ink film or a heat-sensitive recording medium, to as to obtain a high quality of printed images.

The above object may be accomplished according to the principle of the present invention, which provides a recording head having a plurality of recording electrodes and at least one return circuit electrode, which comprises an insulating layer consisting of an integrated or foliated mica disposed between an array of the plurality of recording electrodes and the above-indicated at least one return circuit electrode, so as to form a multi-layer structure which includes the recording electrodes, the above-indicated at least one return circuit electrode and the insulating layer. The recording electrodes and the above-indicated at least one return circuit electrode are formed of an electrically conductive material which has a higher degree of wear resistance than that of the integrated mica.

In the recording head wherein an integrated mica is used as the insulating layer disposed between the recording and return circuit electrodes which are highly resistant to wear, a spacing between each recording electrode and the corresponding return circuit electrode is defined with high consistency, thereby permitting a stable permanent contact of the recording and return circuit electrodes with the electrically resistive layer or electrically resistive ink or coloring layer of the ink film or heat-sensitive recording medium. Further, the use of the integrated mica is effective to protect the insulating layer against deterioration of its insulating property due to heat generated by the electrically resistive layer, for example, and to avoid a chronological change in the thickness of the insulating layer, which has adverse influences on the recording head. Thus, the recording head according to the invention permits high-speed printing with high operating reliability, and an improved quality of the obtained images.

As described above, the recording and return circuit electrodes of the recording head according to the invention are formed of an electrically conductive material which has a higher degree of wear resistance than the integrated mica. More specifically, metals such as chromium, titanium, tantalum, zirconium, alloys containing at least one of these metals, and compounds of these metals are preferably used as a major component of the electrically conductive material for the electrodes, since these metals or alloys have high mechanical wear resistance, and are effective to minimize consumption of the electrodes based on their electric operations. Among the metals indicated above, chromium metals, or alloys or compounds containing chromium are particularly preferrably used as a major component of the electrically conductive material for the electrodes.

According to one form of the present invention, the recording head includes a first and a second substrate, which are less resistant to wear than the electrodes formed on the substrates. More specifically, the substrates are preferably formed of a ceramic material which has higher heat resistance and lower hardness than those of the material for the electrodes. In particular, a substrate employing an integrated or foliated mica, or a highly machinable glass ceramic containing mica is preferred.

In view of the materials for the electrodes and the substrates as described above, the integrated mica used as an insulating layer exhibits an optimum wear characteristic which permits a better contact between the electrodes and the electrically resistive layer or electrically resistive ink or coloring layer, and a high quality of images to be printed. The integrated mica consists of a relatively thin sheet of electrically insulating ceramic material, which is elastic, and highly heat-resistant, i.e., resistant to a temperature of 500° C. or higher. Accordingly, the recording head of the present invention is capable of applying suitable amounts of printing pressure and heat to the ink layer of the ink film, even if the image transfer operation is effected at a considerably high speed.

The integrated mica is formed by foliating mica flakes into a thin sheet while being compressed with a high pressure at a high temperature. The integrated mica is a preferred material for the insulating layer disposed between the electrodes, in terms of its excellent consistency in thickness of the sheet and its resistance to flaking-off. The integrated mica generally has a thickness of 40–500 microns.

In multi-layer structures of recording head according to illustrated embodiments of the present invention which wi!l be described, an integrated mica is superposed on a substrate on which a plurality of recording electrodes are forced in an array. In fabricating such a multi-layer structure, a suitable adhesive consisting of an inorganic material such as alumina, silica and boron nitride, a resin material such as epoxy, phenol and polyimide, or a compound including the inorganic and resin materials indicated above may be used to bond the substrate and the mica sheet with each other. The bonding is also possible by using a molten glass as an adhesive, or by using a jig for mechanically fixing the substrate and the mica sheet to each other.

BRIEF DESCRIPTION OF THE DRAWINGS

The above and optional objects, features and advantages of the present invention will be better understood by reading the following detailed description of presently preferred embodiments, when considered in connection with the accompanying drawings, in which.

DETAILED DESCRIPTION OF THE INVENTION

To further clarify the concept of the present invention, preferred embodiments of the invention will be described. However, it is to be understood that the invention is not limited to the details of these illustrated embodiments, but may be embodied with various changes, modifications and improvements which may occur to those skilled in the art, without departing from the spirit and scope of the invention defined in the appended claims.

Figure 1:
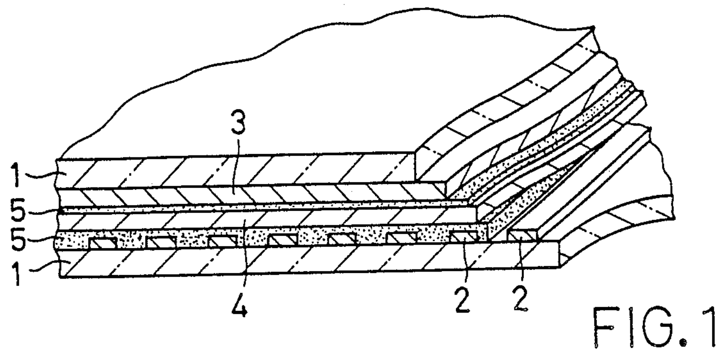
FIG. 1 is a schematic perspective view of a front portion of a recording head used in Example 1 constructed according to one embodiment of the invention.

Referring first to FIG. 1, there is shown a recording head which has a laminar or multi-layer structure including two substrates 1. Each substrate 1 is formed of a highly machinable, glass ceramic containing mica. On each of the opposite surfaces of the substrates 1, a film of chromium is formed by sputtering, and the formed chromium film is subjected t heat treatment. Thus, a planar common return circuit electrode 3 is formed on one of the substrates 1. To form 272 parallel strip-like recording electrodes 2 in a desired pattern, the film of chromium applied to the other substrate 1 is subjected to a photo-etching process well known in the art. Each recording electrode 2 has a width of 80 microns and a thickness of 4 microns, and the electrodes 2 are equally spaced apart from each other at a pitch of 170 microns (distance between centers of the adjacent electrodes 2). Between the array of the recording electrodes 2 and the single planar return circuit electrode 3, there is interposed an insulating layer 4 in the form of an integrated or foliated mica having a thickness of 100 microns so that the insulating layer 4 is bonded to the return circuit electrode 3 and the recording electrodes 2 or corresponding substrate 1, through respective adhesive layers 5. Thus, the recording head (Example 1) is prepared.

Figure 2:
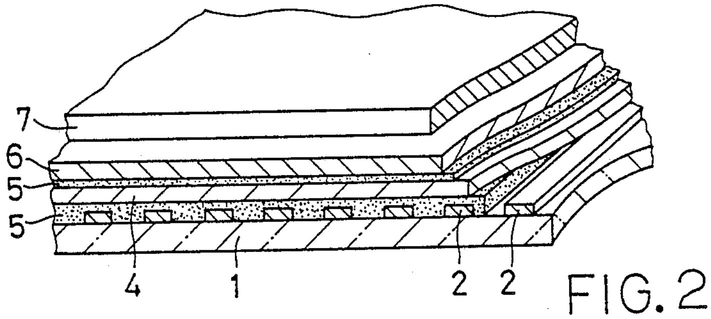
FIG. 2 is a schematic perspective view of a front portion of a recording head used in Example 2 constructed according to another embodiment of the invention.

Referring next to FIG. 2 there is shown another embodiment (Example 2) of the present invention. In this embodiment, the recording head includes the single substrate 1, array of recording electrodes 2, insulating layer 4, and adhesive layers 5 as used in the embodiment of FIG. 1, and a planar common return circuit electrode 6 which consists of an electrically conductive foil of stainless steel having a thickness of 50 microns. The recording head of the embodiment of FIG. 2 further includes a plate 7 made of alumina, which is superposed on the foil of the return circuit electrode 6, in place of the substrate 1 which supports the return circuit electrode 3 of the preceding embodiment.

Figure 3:
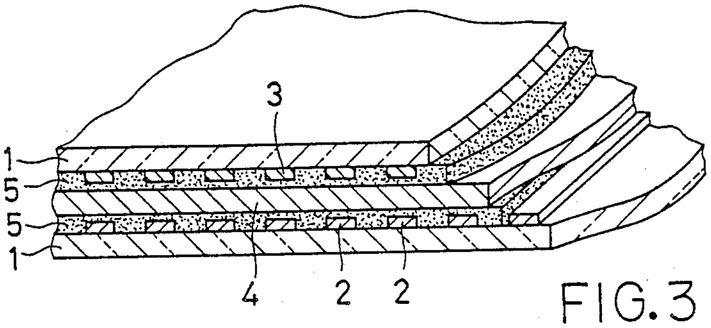
FIG. 3 is a schematic perspective view of a front portion of a further embodiment of the invention, wherein a plurality of return circuit electrodes are formed in an array corresponding to an array of the recording electrodes of FIG. 1.

FIG. 3 shows a modified embodiment of the recording head which is different from Example 1 of FIG. 1 in that a plurality of return circuit electrodes 3 similar to the recording electrodes 2 are formed in an array by a suitable pattern forming process.

For each of the examples constructed as described above, a distance between each recording electrode and the return circuit electrode in a direction of thickness of the multi-layer structure, i.e., a sum of the thicknesses of the insulating layer and adhesive layers was measured. The results of the measurements were indicated in Table 1. As a comparative example, a recording head was prepared by forming the insulating layer of an epoxy resin (Example 3). Another comparative example of the recording head was prepared such that the insulating layer was formed of ordinary mica (Example 4). The results of the measurements on these comparative examples were also indicated in Table 1.

TABLE 1

| | Material of Insulating layer | Distance between electrodes before testing |
|---|---|---|
| Present Invention | | |
| Example 1 | Integrated mica | 125 ± 5 μm |
| Example 2 | Integrated mica | 125 ± 8 μm |
| Comparative | | |
| Example 3 | Epoxy resin | 90 ± 20 μm |
| Example 4 | Ordinary Mica | 150 ± 50 μm |

Recording devices incorporating the recording heads of Examples 1–4 were tested by continuously moving the recording head with its recording electrodes held in sliding contact with an electrically resistive layer of an ink film, so as to effect printing on a recording medium. During the test, a change in the quality of images printed on the recording medium was observed. The test showed high-density, high-quality images printed by the recording devices incorporating the recording heads of Examples 1 and 2 each of which uss an integrated mica as the insulating layer. After the test, the recording surfaces of the recording heads of Examples 1 and 2 which had been held in contact with the electrically resistive layer were observed with a microscope. This microscopic observation revealed that the recording and return circuit electrodes protruded from the exposed and faces of the substrate(s) and the insulating layer in a direction perpendicular to the plane of the recording surface of the head.

In the case of the recording devices incorporating the recording heads of Comparative Examples 3 and 4, the shapes of dots produced by these recording heads tended to vary even at an initail stage of the printing operation, thereby causing a variation in the images printed on the recording medium. The test showed a chronological change in the quality of the printed images, in Example 3 and 4. Further, the microscopic examination on the recording surfaces of these recording heads revealed that a portion of the insulating layer was damaged.

After the continuous testing operations, the distance between each recording electrode and the return circuit electrode was measured on each of the recording heads of Examples 1–4. The measurements were indicated in Table 2.

TABLE 2

| | Distance between electrodes after continuous printing operations |
|---|---|
| Present Invention | |
| Example 1 | 124 ± 6 μm |
| Example 2 | 125 ± 9 μm |
| Comparative | |
| Example 3 | 85 ± 30 μm |
| Example 4 | 150 ± 50 μm |

It will be understood from the above description that the distance between each recording electrode and corresponding return circuit electrode is determined with high accuracy and consistency, thereby assuring a better electrical contact of the recording and return circuit electrodes with the electrically resistive layer of the ink film, and a suitable amount of printing pressure on the ink layer of the ink film. Even if a printing cycle by the recording head is repeated with the electrically resistive layer being continuously heated, the insulating layer disposed between the recording and return circuit electrodes does not suffer from a substantial change due to heat generated by the resistive layer. Accordingly, the present recording head is capable of effecting high speed printing with improved operating reliability and enhanced quality of printed images.

What is claimed is:

1. A recording head having a plurality of recording electrodes and at least one return circuit electrode, comprising:

an insulating layer consisting of an integrated mica disposed between an array of said plurality of recording electrodes and said at least one return circuit electrode, so as to form a multi-layer structure which includes said recording electrodes, said at least one return circuit electrode and said insulating layer; and said recording electrodes and said at least one return circuit electrode being formed of an electrically conductive material which has a higher degree of wear resistance than that of said integrated mica.

2. A recording head according to claim 1, wherein said multi-layer structure includes a first and a second substrate which are made of a material having a lower degree of wear resistance than said recording and return circuit electrodes, said array of the recording electrodes being formed from a film applied to said first substrate while said at least one return circuit electrode being formed from a film applied to said second substrate, such that said insulating layer is interposed between said array of the recording electrodes and said at least one return circuit electrode.

3. A recording head according to claim 2, wherein said array of the recording electrodes is formed by photo-etching said film on said first substrate.

4. A recording head according to claim 2, wherein said at least one return circuit electrode consists of a single planar common electrode formed of said film on said second substrate.

5. A recording head according to claim 2, wherein said at least one return circuit electrode consists of an array of return circuit electrodes which is formed by photo-etching said film on said second substrate.

6. A recording head according to claim 1, wherein at least said return circuit electrode consists of a foil of a metal.

7. A recording head according to claim 1, wherein said multi-layer structure includes a substrate having a lower degree of wear resistance than that of said recording electrodes, said array of recording electrodes being formed from a film applied to said substrate, said return circuit electrode rode consisting of a foil of a metal.

8. A recording head according to claim 1, wherein said integrated mica of said insulating layer has a thickness of 40–500 microns.

9. A recording head according to claim 1, wherein said multi-layer structure includes a first substrate on which said array of the recording electrodes is formed, a second substrate on which said at least one return circuit electrode is formed, a first adhesive layer interposed between said integrated mica and said array of the recording electrodes, and a second adhesive layer interposed between said integrated mica and said at least one return circuit electrode.

10. A recording head according to claim 1, wherein said multi-layer structure includes at least one substrate made of a highly machinable glass ceramic material which contains mica.

* * * * *